Oct. 10, 1933.     T. MIDGELEY, JR., ET AL     1,930,129
MANUFACTURE OF ALIPHATIC FLUORO COMPOUNDS
Filed April 5, 1930     2 Sheets-Sheet 1

INVENTOR
Thomas Midgley, Jr.
BY Albert L. Henne
Robert R. McNary
Spencer, Hardman, and the ATTORNEYS

UNITED STATES PATENT OFFICE 1,930,129

MANUFACTURE OF ALIPHATIC FLUORO COMPOUNDS

Thomas Midgley, Jr., Worthington, Albert L. Henne, Columbus, and Robert R. McNary, Dayton, Ohio, assignors to Frigidaire Corporation, Dayton, Ohio, a corporation of Delaware Application April 5, 1930. Serial No. 441,815

33 Claims. (Cl. 260—162)

This invention relates to the manufacture of fluorine derivatives of hydrocarbons.

An object of our invention is to provide a process for the manufacture of fluorine derivatives and particularly for the manufacture of the fluorine derivatives of aliphatic hydrocarbons.

In its generic aspect, our process comprises the novel combination of steps including the interaction of an aliphatic halide with a fluorating agent to substitute at least one fluorine atom for halogen other than fluorine, the separation by dephlegmation and fractionation of the insufficiently fluorated products from the sufficiently fluorated products as they are formed, and the return from the dephlegmator direct to the reaction field, of the separated insufficiently fluorated products. The nature of the fluorating agent is immaterial.

In its more specific aspect, our process comprises controlling the conditions of the reaction to minimize the formation of over-fluorated products and controlling the temperature and pressure of the dephlegmator to approximate the vapor pressure curve of the fluorated product desired to thereby ensure practically complete separation by condensation of the insufficiently fluorated products.

Our process, because it minimizes the formation of over-fluorated products and because it returns direct from the dephlegmator to the reaction field the insufficiently fluorated products, results in an extremely high yield of the fluorated product desired.

Figure 1:
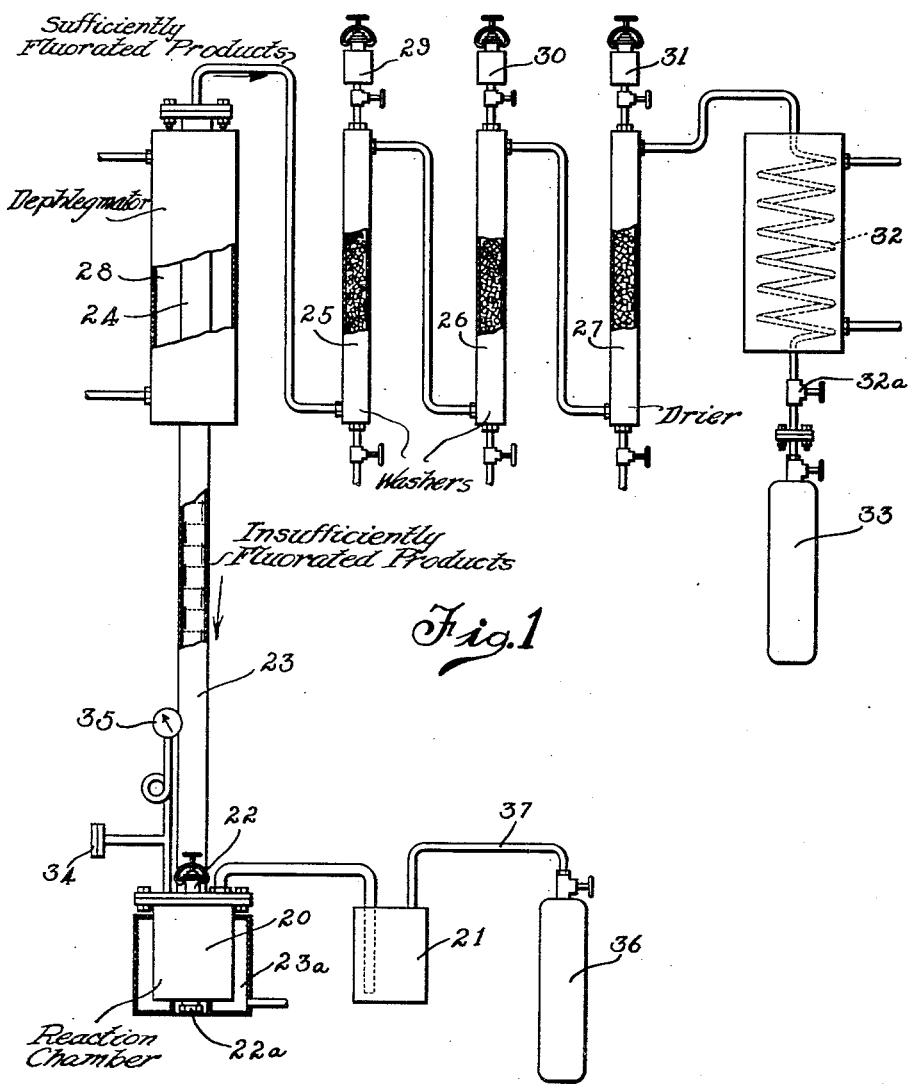
Figure 2:
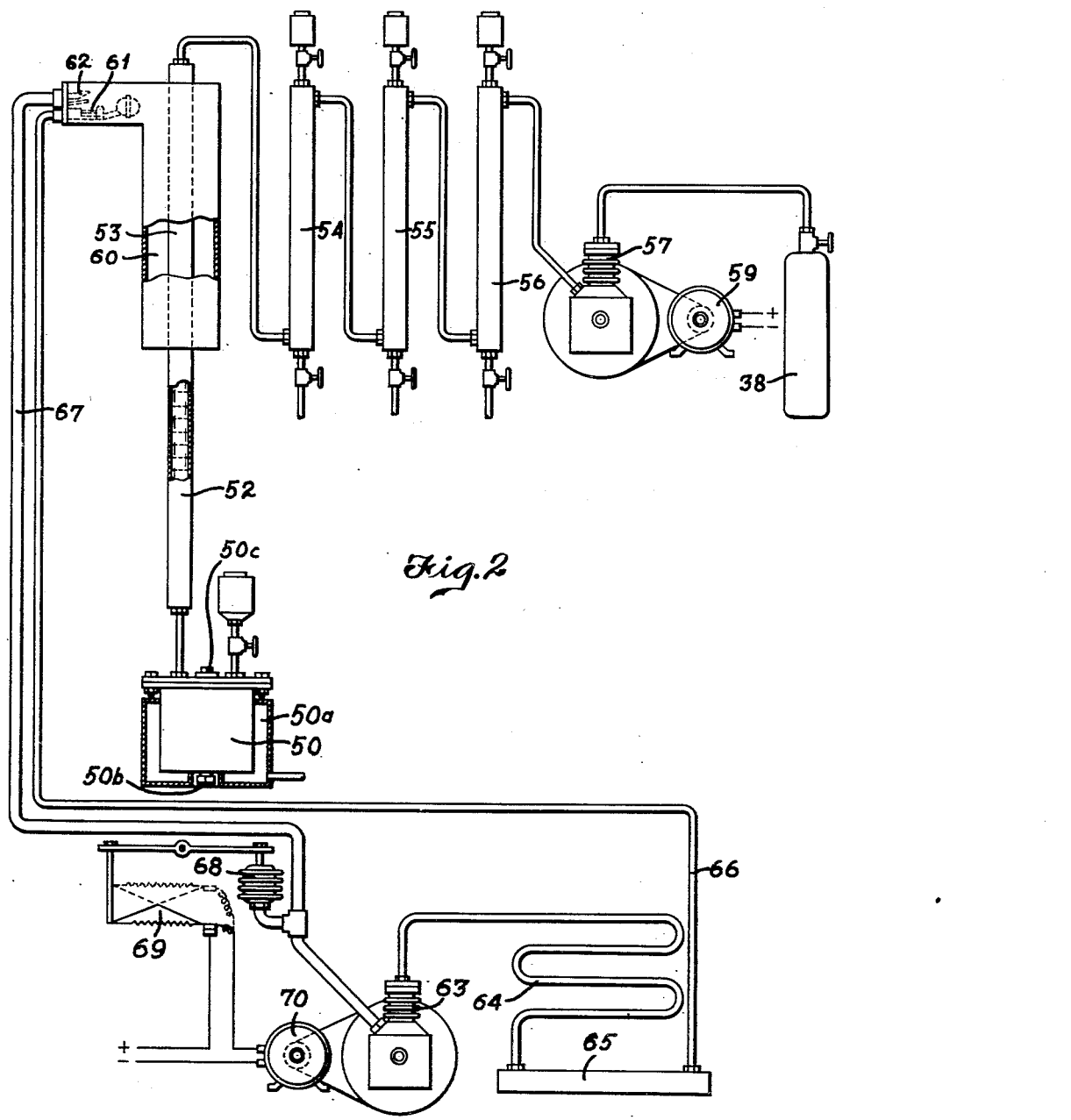

For the purpose of more clearly disclosing our process we have shown in Figs. 1 and 2 diagrammatic illustrations of two forms of apparatus wherein the individual steps may be carried out.

The apparatus disclosed in Fig. 1 comprises a reaction chamber 20 connected to a dephlegmator 24 through a fractionating column 23. The top of the dephlegmator in connected to two serially arranged washers 25 and 26 and washer 26 is in turn connected in series to a drier 27. At its upper end the drier 27 is connected through a condenser 32 to a liquid receiver 33.

The reaction chamber 20 is provided with heating means, herein shown as a steam or hot fluid jacket 23a. The reaction chamber is also provided with an opening 22, which opening is covered by means of a removable cover, and an opening 22a is provided in the bottom of the reaction chamber. The opening 22 may be used for the supply of raw material while the opening 22a may be used for the removal of the residual products. The reaction chamber 20 may also, if desired, be provided with reacting materials from the supply chamber 21 by means of the pump 36 herein shown as a gas chamber. The reaction chamber 20 is also provided with a suitable safety release diaphragm 34 and with a pressure gauge 35.

The dephlegmator is provided with cooling means which in Fig. 1 is shown in the form of a jacket 28 for cooling fluid.

Washers 25 and 26 are provided with a diluted aqueous solution of caustic soda and this solution may be replenished periodically from supply chambers 29 and 30 respectively. The drier 27 contains a concentrated solution of sulphuric acid and this solution may likewise be replenished periodically from the supply chamber 31.

The temperature of the dephlegmator 24 is controlled in accordance with the pressure employed so that the pressure temperature conditions are in the neighborhood of the vapor pressure curve of the compound desired. The pressure within the system is obtained in this particular case by correlating the discharge through the valve 32a to the reaction rate. This valve may be either manually or automatically controlled.

As a specific example, dichloro-difluoro methane may be obtained by interacting carbon tetrachloride with a fluorinating agent in the presence of a catalytic agent in the reaction-chamber 20 and removing the dichloro-difluoromethane from the dephlegmator as it is formed. For instance, carbon tetrachloride is introduced into the reaction chamber from the supply chamber 21 and a fluorating agent SbF$_3$ together with a catalyst such as SbCl$_5$ are introduced into the reaction chamber 20 through the removably covered opening 22. The reaction may be initiated and accelerated by warming the reaction chamber 20 as for example by maintaining the steam jacket 23 under a steam pressure of about 90 lbs. gauge. The gaseous reaction products rise through the fractionating column 23 and the reflux for the column is obtained from the dephlegmator 24. The temperature of the dephlegmator is maintained at approximately the proper temperature by circulating water through the jacket 28 at about a temperature of 15 to 20° C. when the pressure in the reaction chamber is maintained at about 50 lbs. At this temperature and pressure, CCl$_2$F$_2$ is obtained from the top of the dephlegmator, and any insufficiently fluorated compounds such as $CCl_3F$ and $CCl_4$ are returned to the reaction chamber from the dephlegmator 24 to be further fluorated to the desired derivative $CCl_2F_2$. By this method we have been able to obtain over 90% yield of $CCl_2F_2$ based on the amount of antimony fluoride used.

Any of the following substances may be obtained as derivatives of carbon tetrachloride: $CCl_2F_2$, $CClF_3$, and $CCl_3F$. To obtain any one of these products, the pressure and the temperature in the fractionating column and the dephlegmator is maintained substantially on the vapor pressure curve of the product desired. The vapor pressure curve is of course a curve which records the boiling point of the desired compound at pressures prevailing within the dephlegmator. For example, in the preparation of $CCl_2F_2$, when operating the reaction chamber at atmospheric pressure we maintain the dephlegmator at about $-20°$ C. When the pressure is 50 lbs. the temperature is about 15° C.

The temperature to be maintained in the reaction chamber is very flexible. The speed of the reaction varies with the temperature. The temperature to be maintained in the reaction chamber 20 depends among other things on the capacity of the dephlegmator and the fractionating column.

With the above reactants, we may obtain $CCl_3F$, $CCl_2F_2$ and/or $CClF_3$, which we call $F_1$, $F_2$ and/or $F_3$ compounds. If we desire to inhibit the formation of $F_3$ we adjust the temperature and pressure control according to the vapor tension curve of $F_2$. If the set of condition corresponds to a point in the vicinity of this curve, the formation of $F_3$ is minimized. The more desirable point to adopt is in the vicinity and below the curve. By returning $F_1$ to the reaction chamber and minimizing or completely inhibiting the formation of $F_3$ we promote a high yield. The presence of some $F_1$ in the final product is not detrimental since this can be fractioned out and retreated to form more $F_2$.

In general, in the manufacture of corresponding fluorine compounds we favor in the same manner the return of the compound having the smaller fluorine content to the reaction field and inhibit the formation of compounds having a higher fluorine content than in the desired product.

Operating under non-aqueous conditions gives a high percentage yield. Apparently this inhibits ionization and side reactions.

Other reactants may be used to obtain other halo-fluoro derivatives of methane. For example, $CH_2ClF$, $Cl-Cl_2F$, $CHClF_2$ may be obtained from $CHCl_3$. Specifically, $CHCl_2F$ may be obtained by introducing $CHCl_3$, $SbF_3$, and $SbCl_5$ into the reaction chamber 20 and the pressure and temperature in the fractionating column and the dephlegmator may be adjusted to the pressure temperature curve of $CHCl_2F$ and the operation may proceed in a corresponding manner to that described for the production of $CCl_2F_2$. In this operation the reflux from the column contains as an insufficiently fluorinated compound $CHCl_3$.

Fluorine derivatives of other aliphatic hydrocarbons may be obtained. Thus a chlorine derivative of ethane, ethylene, propane, butane, etc., may be introduced into the reaction chamber 20 together with a suitable supply of a fluorating agent such as $SbF_3$ in the presence of a catalyst as $SbCl_5$, and by subjecting the gaseous reaction products to the proper fractionation in the column 23 and dephlegmator 24 the desired halo fluoro derivatives of these aliphatic hydrocarbons may be obtained.

Examples of other aliphatic fluoro chloro derivaties which may be obtained according to this invention are as follows:

$CHCl_2-CHCl_2$ will react with $SbF_3$ in the presence of the catalyst $SbCl_5$ to obtain $CHCl_2-CHClF$ and the temperature and pressure in the dephlegmator may be adjusted to discharge the $CHCl_2-CHClF$ from the reaction. Should a further fluorination be desired, it can be obtained by adjustment of the pressure and temperature of the dephlegmator. A mixture of $CHClF-CHCl_2$ and $CHCl_2-CHF_2$ will be discharged from the dephlegmator. If these latter two substances are desired separately, fractional distillation may be used to separate them.

$CHCl-CHCl$ may be reacted with $SbF_3$ in the presence of the catalyst $SbCl_5$ to obtain $CHF-CHCl$ or, upon further fluorination by pressure or temperature adjustment of the dephlegmator, to obtain $CHF-CHF$.

Should it be desired to operate at atmospheric pressure or at a very low pressure the dephlegmator may be subjected to artificial refrigeration. Thus as shown in Fig. 2 a reaction chamber 50 may be provided with supply chamber 51, steam jacket 50a, residue discharge opening 50b, and supply opening 50c, fractionating column 52, dephlegmator 53, washing columns 54, 55, drying column 56, and motor 59 corresponding to similar parts of Fig. 1.

Artificial refrigeration for the dephlegmator 53 may be provided, for instance, as shown in the jacket 60. The jacket 60 may contain liquid refrigerant introduced through the float control valve 61 and the refrigerant evaporated in the jacket may leave through the outlet fitting 62. The liquid refrigerant may be supplied by any suitable means as for instance a compressor 63 discharging into a condenser 64 which in turn discharges to a liquid receiver 65. This receiver discharges through the pipe 66 to the valve 61. The fitting 62 discharges through the pipe 67 back to the compressor 63. An automatic control for the compressor, in order to maintain the jacket 60 at the desired temperature may include an expansible bellows 68 operating a snap switch 69 for controlling the operation of the motor 70 which drives the compressor 63.

While we have disclosed our invention in connection with specific apparatus for carrying out the process for the manufacture of specific compounds, it should be understood that reference thereto is made to illustrate our generic invention.

What is claimed is as follows:

1. The method of manufacturing difluoro dichloro methane which consists in progressively replacing chlorine atoms of carbon tetrachloride with fluorine by interacting $CCl_4$ with $SbF_3$, removing the difluoro dichloro methane by fractionation as formed, and returning from the fractionation for further interaction with $SbF_3$, methane derivatives having less fluorine content than difluoro dichloro methane.

2. The one step method of manufacturing a desired aliphatic fluoro halide which consists in interacting an aliphatic halide with $SbF_3$ to replace at least one halogen atom other than fluorine with fluorine, driving off the reaction products, separating from the reaction products any insufficiently fluorated compound and interacting the insufficiently fluorated compound with SbF₃.

3. The one step method of manufacturing an aliphatic fluoro halide which consists in interacting an aliphatic halide with SbF₃ to replace at least one halogen atom other than fluorine with fluorine, removing reaction products from the reaction field in gaseous state, condensing and returning to the reaction field reaction products having too low a fluorine content and withdrawing reaction products having the desired fluorine content.

4. The method of manufacturing a desired aliphatic fluoro halide which consists in interacting an aliphatic halide with SbF₃ to replace halogen atoms other than fluorine of an aliphatic halide with fluorine and removing the desired fluoro halide by fractionation as it is formed.

5. The method of manufacturing a desired aliphatic fluoro halide which consists in interacting an aliphatic halide with SbF₃ to replace halogen atoms other than fluorine of an aliphatic halide with fluorine and removing the desired fluoro halide by fractionation as it is formed and inhibiting the formation of halides having a higher fluorine content.

6. The process of manufacturing a desired aliphatic fluoro halide which consists in interacting an aliphatic halide containing halogen other than fluorine, with a fluorating agent to replace at least one halogen atom other than fluorine, with fluorine, discharging the gaseous products resulting from the reaction into a dephlegmator, condensing the insufficiently fluorated products in the dephlegmator, returning the condensed products directly from the dephlegmator to be further fluorated and withdrawing from the dephlegmator the fluorated product desired.

7. The process of manufacturing a desired aliphatic fluoro halide which consists in interacting an aliphatic halide containing halogen other than fluorine with a fluorating agent, discharging the resulting gaseous products into a dephlegmator, maintaining the temperature and pressure of the dephlegmator substantially on the vapor pressure curve of the fluorated product desired, condensing the insufficiently fluorated products in the dephlegmator, returning the condensed products directly from the dephlegmator to be further fluorated and withdrawing from the dephlegmator the fluorated product desired.

8. The process of manufacturing a fluoro halide of methane which comprises interacting a methane derivative containing halogen other than fluorine, with a fluorating agent to replace at least one halogen atom other than fluorine with flourine, discharging the resulting gaseous products into a dephlegmator, maintaining the temperature and pressure of the dephlegmator substantially on the vapor pressure curve of the methane derivative desired, condensing the insufficiently fluorated products, returning the condensed products directly from the dephlegmator to be further fluorated and withdrawing from the dephlegmator the fluorated methane derivative desired.

9. The process of manufacturing a fluoro halide of ethane which comprises interacting an ethane derivative containing halogen other than fluorine, with a fluorating agent to replace at least one halogen atom other than fluorine with fluorine, discharging the resulting gaseous products into a dephlegmator, maintaining the temperature and pressure of the dephlegmator substantially on the vapor pressure curve of the ethane derivative desired, condensing the insufficiently fluorated products, returning the condensed products directly from the dephlegmator to be further fluorated and withdrawing from the dephlegmator the fluorated ethane derivative desired.

10. The process of manufacturing a chloro fluoro derivative of an aliphatic hydrocarbon which comprises interacting an aliphatic hydrocarbon derivative containing chlorine with a fluorating agent to replace at least one chlorine atom with fluorine, discharging the gaseous products resulting from the reaction into a dephlegmator, maintaining the temperature and pressure of the dephlegmator substantially on the vapor pressure curve of the fluorated product desired, condensing the insufficiently fluorated products in the dephlegmator, returning the condensed products direct from the dephlegmator for further fluoration and withdrawing the sufficiently fluorated product from the dephlegmator.

11. The process of manufacturing a chloro fluoro derivative of methane which comprises interacting a methane derivative containing chlorine with a fluorating agent to replace at least one chlorine atom with fluorine, discharging the resulting products into a dephlegmator, maintaining the temperature and pressure of the dephlegmator substantially on the vapor pressure curve of the fluorated product desired, condensing the insufficiently fluorated products in the dephlegmator, returning the condensed products direct from the dephlegmator to be further fluorated and withdrawing the fluorated product desired from the dephlegmator.

12. The process of manufacturing a chloro fluoro derivative of ethane which comprises interacting an ethane derivative containing chlorine with a fluorating agent to replace at least one chlorine atom with fluorine, discharging the resulting products into a dephlegmator, maintaining the temperature and pressure of the dephlegmator substantially on the vapor pressure curve of the fluorated product desired, condensing the insufficiently fluorated products in the dephlegmator, returning the condensed products direct from the dephlegmator to be further fluorated and withdrawing the fluorated product desired from the dephlegmator.

13. The process of manufacturing $CCl_2F_2$ which comprises interacting $CCl_4$ with a fluorating agent, discharging the resulting gaseous products into a dephlegmator, maintaining the temperature and pressure of the dephlegmator substantially on the vapor pressure curve of $CCl_2F_2$, condensing the insufficiently fluorated products in the dephlegmator, returning the condensed products to be further fluorated and withdrawing $CCl_2F_2$ from the dephlegmator.

14. The one-step method of manufacting a desired aliphatic fluoro halide which consists in progressively replacing halogen atoms other than fluorine of an aliphatic halide with fluorine and removing the desired fluoro halide by fractionation as it is formed.

15. The one-step method of manufacturing a desired aliphatic fluoro halide which consists in progressively replacing halogen atoms other than fluorine of an aliphatic halide with flurine and removing the desired fluoro halide by fractionation as it is formed and returning from the fractionation for further replacement by fluorine, halides not fluorinated to the desired extent.

16. The one-step method of manufacturing a desired alkyl fluoro halide which consists in progressively replacing halogen atoms other than fluorine of an alkyl halide with fluorine and removing the desired derivative by fractionation as it is formed.

17. The one-step method of manufacturing a desired alkyl fluoro halide which consists in progressively replacing halogen atoms other than fluorine of an alkyl halide with fluorine, removing the desired derivative by fractionation as it is formed, and returning from the fractionation for further replacement by fluorine the halides not fluorinated to the desired extent.

18. The one-step method of manufacturing a desired methyl fluoro halide which consists in progressively replacing halogen atoms other than flurine of a halo-methane with fluorine and removing the desired derivative by fractionation as it is formed.

19. The one-step method of manufacturing a desired methyl fluoro halide which consists in progressively replacing halogen atoms other than fluorine of a halo-methane with fluorine, removing the desired derivative by fractionation as it is formed, and returning from the fractionation for further replacement by fluorine the halides not fluorinated to the desired extent.

20. The one-step method of manufacturing difluoro dichloro methane which consists in progressively replacing chlorine atoms of carbon tetrachloride with fluorine and removing the difluoro dichloro methane by fractionation as formed.

21. The one-step method of manufacturing difluoro dichloro methane which consists in progressively replacing chlorine atoms of carbon tetrachloride with fluorine and removing the difluoro dichloro methane by fractionation as formed, and returning from the fractionation for further replacement by fluorine, methane derivatives having less fluorine content than difluoro dichloro methane.

22. The one-step method of manufacturing a desired aliphatic fluoro halide which consists in progressively replacing halogen atoms other than fluorine of an aliphatic halide with fluorine by reacting with $SbF_3$, and removing the desired fluoro halide by fractionation as it is formed.

23. The one-step method of manufacturing a desired aliphatic fluoro halide which consists in progressively replacing halogen atoms other than fluorine of an aliphatic halide with fluorine by reacting with $SbF_3$, and removing the desired fluoro halide by fractionation as it is formed and returning from the fractionation for further replacement by fluorine, halides not fluorinated to the desired extent.

24. The one-step method of manufacturing a desired alkyl fluoro halide which consists in progressively replacing halogen atoms other than fluorine of an alkyl halide with fluorine by reacting with $SbF_3$, and removing the desired derivative by fractionation as it is formed.

25. The one-step method of manufacturing a desired alkyl fluoro halide which consists in progressively replacing halogen atoms other than fluorine of an alkyl halide with fluorine by reacting with $SbF_3$, removing the desired derivative by fractionation as it is formed, and returning from the fractionation for further replacement by fluorine the halides not fluorinated to the desired extent.

26. The one-step method of manufacturing a desired methyl fluoro halide which consists in progressively replacing halogen atoms other than fluorine of a halo methane with fluorine by reacting with $SbF_3$, and removing the desired derivative by fractionation as it is formed.

27. The one-step method of manufacturing a desired methyl fluoro halide which consists in progressively replacing halogen atoms other than fluorine of a halo methane with fluorine by reacting with $SbF_3$, removing the desired derivative by fractionation as it is formed, and returning from the fractionation for further replacement by fluorine the halides not fluorinated to the desired extent.

28. The one-step method of manufacturing a difluoro dichloro methane which consists in progressively replacing chlorine atoms of carbon tetrachloride with fluorine by reacting with $SbF_3$, and removing the difluoro dichloro methane by fractionation as formed.

29. The one-step method of manufacturing difluoro dichloro methane which consists in progressively replacing chlorine atoms of carbon tetrachloride with fluorine by reacting with $SbF_3$, removing the difluoro dichloro methane by fractionation as formed, and returning from the fractionation for further replacement by fluorine, methane derivatives having less fluorine content than difluoro dichloro methane.

30. The one-step method of manufacturing a desired ethyl fluoro halide which consists in progressively replacing halogen atoms other than fluorine of a halo ethane with fluorine and removing the desired derivative by fractionation as it is formed.

31. The method of making difluoro-dichloro-methane, which comprises reacting carbon tetrachloride with antimony trifluoride at a temperature above 25° C., while maintaining the reaction system at a superatmospheric pressure above the vapor pressure of monofluoro-trichloro-methane but below that of difluoro-dichloro-methane.

32. The method of making difluoro-dichloro-methane, which comprises reacting carbon tetrachloride and antimony trifluoride, in the presence of antimony pentachloride, at a temperature above 25° C., while maintaining the reaction system at a superatmospheric pressure above the vapor pressure of monofluoro-trichloro-methane, but below that of difluoro-dichloro-methane.

33. In a method of making difluoro-dichloro-methane by reacting carbon tetrachloride and antimony trifluoride, the steps of reacting such components at a temperature above 25° C., while maintaining the reaction system at a superatmospheric pressure above the vapor pressure of monofluoro-trichloro-methane, but below that of difluoro-dichloro-methane and removing difluoro-dichloro-methane from the reaction system while at such pressure.

THOMAS MIDGLEY, JR.
ALBERT L. HENNE.
ROBERT R. McNARY.